United States Patent
Tran

(10) Patent No.: US 11,816,399 B2
(45) Date of Patent: Nov. 14, 2023

(54) SEMI-SUPERVISED LAYOUT ESTIMATION OF INTERIOR SPACES FROM PANORAMA IMAGES

(71) Applicant: Flyreel, Inc., Denver, CO (US)

(72) Inventor: Phi Tran, Garden Grove, CA (US)

(73) Assignee: Flyreel, Inc., Denver, CO (US)

( * ) Notice: Subject to any disclaimer, the term of this patent is extended or adjusted under 35 U.S.C. 154(b) by 0 days.

(21) Appl. No.: 17/823,205

(22) Filed: Aug. 30, 2022

(65) Prior Publication Data

US 2022/0414279 A1 Dec. 29, 2022

Related U.S. Application Data

(63) Continuation of application No. 17/401,912, filed on Aug. 13, 2021, now Pat. No. 11,507,713.

(60) Provisional application No. 63/157,448, filed on Mar. 5, 2021.

(51) Int. Cl.
| | |
|---|---|
| *G06T 19/00* | (2011.01) |
| *G06F 30/13* | (2020.01) |
| *G06N 3/088* | (2023.01) |
| *G06N 3/047* | (2023.01) |
| *G06F 111/10* | (2020.01) |

(52) U.S. Cl.
CPC ............. *G06F 30/13* (2020.01); *G06N 3/047* (2023.01); *G06N 3/088* (2013.01); *G06F 2111/10* (2020.01)

(58) Field of Classification Search
CPC .. G06F 17/50; G06F 17/5004; G06F 17/5018; G06F 17/5096; G06T 19/00

USPC ............................................................ 703/1
See application file for complete search history.

(56) References Cited

U.S. PATENT DOCUMENTS

| | | | |
|---|---|---|---|
| 2018/0143756 A1 | 5/2018 | Mildrew et al. | |
| 2020/0116493 A1 | 4/2020 | Colburn et al. | |
| 2020/0342307 A1* | 10/2020 | Baughman | G06N 3/084 |

(Continued)

OTHER PUBLICATIONS

Adam Paszke, Sam Gross, Francisco Massa, Adam Lerer, James Bradbury, et al. PyTorch: An Imperative Style, High-Performance Deep Learning Library. In Advances in Neural Information Processing Systems, pp. 8024-8035. Curran Associates, Inc., 2019.

(Continued)

*Primary Examiner* — Gordon G Liu
(74) *Attorney, Agent, or Firm* — TROUTMAN PEPPER HAMILTON SANDERS LLP; James E. Schutz; Mark Lehi Jones

(57) ABSTRACT

Introduced here computer programs and associated computer-implemented techniques for modeling interior spaces based on an analysis of digital images of those interior spaces. These computer programs can be trained to accomplish this without using extensive sets of labeled data. Instead, these computer programs are able to effectively supplement labeled data with unlabeled data to accurately model interior spaces in settings where limited labeled data is available. Such an approach allows these computer programs to establish the layouts of interior spaces without extensive knowledge of those interior spaces and without users, who are responsible for generating the digital images, interacting with the surroundings in a meaningful way.

16 Claims, 12 Drawing Sheets
(5 of 12 Drawing Sheet(s) Filed in Color)

(56) References Cited

U.S. PATENT DOCUMENTS

| | | | | |
|---|---|---|---|---|
| 2020/0408532 | A1* | 12/2020 | Colburn | G06V 20/36 |
| 2021/0216825 | A1* | 7/2021 | Sedai | G06N 3/08 |
| 2021/0279950 | A1* | 9/2021 | Phalak | G06F 18/23 |

OTHER PUBLICATIONS

Alexander Kolesnikov, Xiaohua Zhai, and Lucas Beyer. Revisiting Self-Supervised Visual Representation Learning. In Computer Vision and Pattern Recognition, 2019.

Angel Chang, Angela Dai, Thomas Funkhouser, Maciej Halber, Matthias Niessner, Manolis Sawa, Shuran Song, Andy Zeng, and Yinda Zhang. Matterport3D: Learning from RGBD Data in Indoor Environments. In International Conference on 3D Vision, 2017.

Antti Rasmus, Harri Valpola, Mikko Honkala, Mathias Berglund, and Tapani Raiko. Semi-Supervised Learning with Ladder Networks. In Advances in Neural Information Processing Systems, 2015.

Antti Tarvainen and Harri Valpola. Mean Teachers are Better Role Models: Weight-Averaged Consistency Targets Improve Semi-Supervised Deep Learning Results. In Advances in Neural Information Processing Systems, 2017.

Avital Oliver, Augustus Odena, Colin Raffel, Ekin D. Cubuk, and Ian J. Goodfellow. Realistic Evaluation of Semi-Supervised Learning Algorithms. In Advances in Neural Information Processing Systems, 2018.

Cheng Sun, Chi-Wei Hsiao, Min Sun, and Hwann-Tzong Chen. HorizonNet: Learning Room Layout With 1D Representation and Pano Stretch Data Augmentation. In Computer Vision and Pattern Recognition, pp. 1047-1056, 2019.

Chuhang Zou, Alex Colburn, Qi Shan, and Derek Hoiem. LayoutNet: Reconstructing the 3D Room Layout from a Single RGB Image. In Computer Vision and Pattern Recognition, pp. 2051-2059, 2018.

Chuhang Zou, Jheng-Wei Su, Chi-Han Peng, Alex Colburn, Qi Shan, Peter Wonka, Hung-Kuo Chu, and Derek Hoiem. 3D Manhattan Room Layout Reconstruction from a Single 360 Image. arXiv:1910.04099, 2019.

Clara Fernandez-Labrador, Jose M. Facil, Alejandro Perez-Yus, Cedric Demonceaux, Javier Civera, and J. J. Guerrero. Corners for Layout: End-to-End Layout Recovery From 360 Images. IEEE Robotics and Automation Letters, 5:1255-1262, 2020.

David Berthelot, Nicholas Carlini, Ekin D. Cubuk, Alex Kurakin, Han Zhang, and Colin Raffel. ReMixMatch: Semi-Supervised Learning with Distribution Alignment and Augmentation Anchoring. In International Conference on Learning Representations, 2020.

David Berthelot, Nicholas Carlini, Ian Goodfellow, Nicolas Papernot, Avital Oliver, and Colin Raffel. MixMatch: A Holistic Approach to Semi-Supervised Learning. In Advances in Neural Information Processing Systems, 2019.

Diederik P. Kingma and Jimmy Ba. Adam: A Method for Stochastic Optimization. In International Conference on Learning Representations, 2015.

Erick Delage, Honglak Lee, and Andrew Y. Ng. A Dynamic Bayesian Network Model for Autonomous 3D Reconstruction from a Single Indoor Image. In Computer Vision and Pattern Recognition, pp. 2418-2428, 2006.

Geoffrey Hinton, Oriol Vinyals, and Jeffrey Dean. Distilling the Knowledge in a Neural Network. In NIPS Deep Learning and Representation Learning Workshop, 2015.

Giovanni Pintore, Claudio Mura, Fabio Ganovelli, Lizeth Fuentes-Perez, Renato Pajarola, and Enrico Gobbetti. Stateof-the-art in Automatic 3D Reconstruction of Structured Indoor Environments. Computer Graphics Forum, 39:667-699, 2020.

Giovanni Pintore, Marco Agus, and Enrico Gobbetti. AtlantaNet: Inferring the 3D Indoor Layout from a Single 360 Image beyond the Manhattan World Assumption. In European Conference on Computer Vision, 2020.

Glenn W. Brier. Verification of Forecasts Expressed in Terms of Probability. Monthly Weather Review, 78:1-3, 1950.

Iro Armeni, Sasha Sax, Amir R. Zamir, and Silvio Savarese. Joint 2D-3D-Semantic Data for Indoor Scene Understanding. arXiv:1702.01105, 2017.

James M. Coughlan and Alan L. Yuille. Manhattan World: Compass Direction from a Single Image by Bayesian Inference. In International Conference on Computer Vision, vol. 2, pp. 941-947, 1999.

Jia Deng, Wei Dong, Richard Socher, Li-Jia Li, Kai Li, and Li Fei-Fei. ImageNet: A Large-Scale Hierarchical Image Database. In Computer Vision and Pattern Recognition, pp. 248-255, 2009.

Jia Zheng, Junfei Zhang, Jing Li, Rui Tang, Shenghua Gao, and Zihan Zhou. Structured3D: A Large Photo-realistic Dataset for Structured 3D Modeling. In European Conference on Computer Vision, 2020.

Kaiming He, Xiangyu Zhang, Shaoqing Ren, and Jian Sun. Deep Residual Learning for Image Recognition. In Computer Vision and Pattern Recognition, pp. 770-778, 2016.

Kevin Jarrett, Koray Kavukcuoglu, Marc'Aurelio Ranzato, and Yann LeCun. What is the best multi-stage architecture for object recognition? In International Conference on Computer Vision, pp. 2146-2153, 2009.

Mehdi Sajjadi, Mehran Javanmardi, and Tolga Tasdizen. Regularization with Stochastic Perturbations for Deep Semi-Supervised Learning. In Advances in Neural Information Processing Systems, 2016.

Mike Schuster and Kuldip K. Paliwal. Bidirectional Recurrent Neural Networks. IEEE Transactions on Signal Processing, 45(11):2673-2681, 1997.

Nitish Srivastava, Geoffrey Hinton, Alex Krizhevsky, Ilya Sutskever, and Ruslan Salakhutdinov. Dropout: A Simple Way to Prevent Neural Networks from Overfitting. Journal of Machine Learning Research, 15:1929-1958, 2014.

Chapelle, 0. et al., "Semi-Supervised Learning." Sep. 2006. Summary retrieved from: <https://mitpress.mit.edu/books/semi-supervised-learning> 3 pages.

Phi Vu Tran. Exploring Self-Supervised Regularization for Supervised and Semi-Supervised Learning. In NeurIPS Workshop on Learning with Rich Experience: Integration of Learning Paradigms, 2019.

Philip Bachman, Ouais Alsharif, and Doina Precup. Learning with Pseudo-Ensembles. In Advances in Neural Information Processing Systems, 2014.

Quoc V. Le, Marc'Aurelio Ranzato, Rajat Monga, Matthieu Devin, Kai Chen, Greg S. Corrado, Jeff Dean, and Andrew Y. Ng. Building High-Level Features Using Large Scale Unsupervised Learning. In International Conference on Machine Learning, 2012.

Samuli Laine and Timo Aila. Temporal Ensembling for Semi-Supervised Learning. In International Conference on Learning Representations, 2017.

Shang-Ta Yang, Fu-En Wang, Chi-Han Peng, Peter Wonka, Min Sun, and Hung-Kuo Chu. DuLa-Net: A Dual-Projection Network for Estimating Room Layouts From a Single RGB Panorama. In Computer Vision and Pattern Recognition, pp. 3358-3367, 2019.

Spyros Gidaris, Praveer Singh, and Nikos Komodakis. Unsupervised Representation Learning by Predicting Image Rotations. In International Conference on Learning Representations, 2018.

Takeru Miyato, Shin-ichi Maeda, Masanori Koyama, and Shin Ishii. Virtual Adversarial Training: A Regularization Method for Supervised and Semi-Supervised Learning. Transactions on Pattern Analysis and Machine Intelligence, 41:1979-1993, 2017.

Takeru Miyato, Shin-ichi Maeda, Masanori Koyama, Ken Nakae, and Shin Ishii. Distributional Smoothing with Virtual Adversarial Training. In International Conference on Learning Representations, 2016.

Vinod Nair and Geoffrey Hinton. Rectified Linear Units Improve Restricted Boltzmann Machines. In International Conference on Machine Learning, 2010.

Wenbin Li, Sajad Saeedi, John McCormac, Ronald Clark, Dimos Tzoumanikas, Qing Ye, Yuzhong Huang, Rui Tang, and Stefan Leutenegger. InteriorNet: Mega-Scale Multi-Sensor Photo-Realistic Indoor Scenes Dataset. In British Machine Vision Conference, 2018.

(56) References Cited

OTHER PUBLICATIONS

Xiaohua Zhai, Avital Oliver, Alexander Kolesnikov, and Lucas Beyer. S4L: Self-Supervised Semi-Supervised Learning. In International Conference on Computer Vision, 2019.

Kinda Zhang, Shuran Song, Ping Tan, and Jianxiong Xiao. PanoContext: A Whole-Room 3D Context Model for Panoramic Scene Understanding. In European Conference on Computer Vision, 2014.

Zhongzheng Ren and Yong Jae Lee. Cross-Domain Self-Supervised Multi-Task Feature Learning using Synthetic Imagery. In Computer Vision and Pattern Recognition, 2018.

* cited by examiner

500

501
Receive input that is indicative of a request to establish the layout of an interior space that includes a series of junctures, each of which represents a point at which a different pair of surfaces are joined

502
Instruct a user to generate a panorama by panning a computing device while a camera generates digital images of the interior space

503
Apply a trained model to the panorama to produce an output that is representative of a juncture predicted by the trained model based on an analysis of the panorama

504
Cause display of at least a portion of the panorama with a graphical element overlaid thereon to indicate a location of the juncture predicted by the trained model

505
Establish the layout of the interior space based on outputs produced by the trained model

506
Encode information regarding the layout in a data structure that is associated with the interior space

507
Cause transmission of the data structure to a destination external to the computing device

FIGURE 5

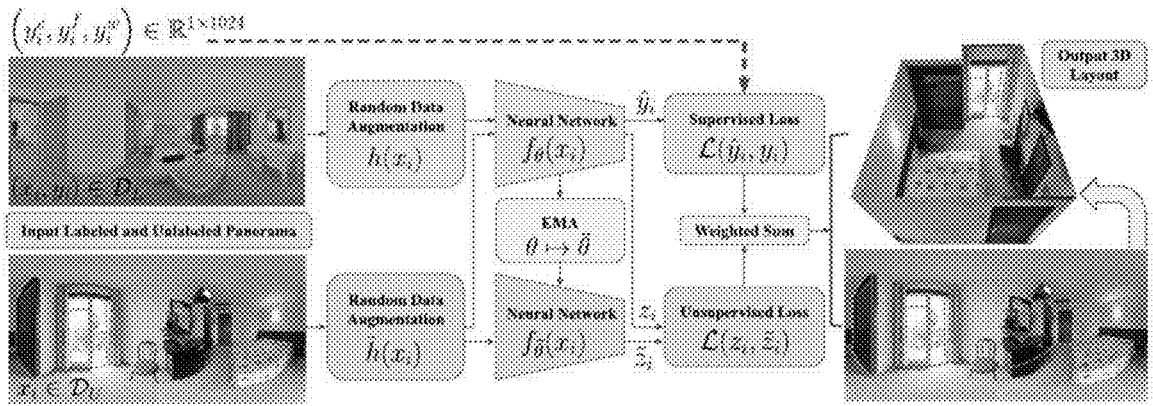

FIGURE 7

Input: Training set of labeled inputs $(x_l, y_l) \in \mathcal{D}_L$.
Training set of unlabeled inputs $x_u \in \mathcal{D}_U$.
Data augmentation functions $h(x)$ and $\bar{h}(x)$.
Student network $f_\theta(x)$ with trainable parameters $\theta$.
Teacher network $f_{\bar\theta}(x)$ with parameters $\bar\theta = \theta$.
Distance function $d$ (e.g., $L_1$ and $L_2$).
for *each epoch over $\mathcal{D}_U$* do
  $b_l \leftarrow h(x_l)$  ▷ Mini-batches of labeled input.
  $b_u \leftarrow \bar{h}(x_u)$  ▷ Mini-batches of unlabeled input.
  for *each mini-batch* do
    $\hat{y}_l \leftarrow f_\theta(b_l)$  ▷ Forward pass on labeled input.
    $z_u \leftarrow f_\theta(b_u)$  ▷ Forward pass on unlabeled input.
    $\bar{z}_u \leftarrow f_{\bar\theta}(b_u)$  ▷ Again using $\bar\theta$.
    $\mathcal{L} \leftarrow \frac{1}{|b_l|} \sum_{i \in b_l} d(\hat{y}_{l_i}, y_{l_i})$  ▷ Supervised loss.
      $+ \frac{\lambda}{|b_u|} \sum_{i \in b_u} d(z_{u_i}, \bar{z}_{u_i})$  ▷ Unsupervised loss.
    $\lambda \leftarrow e^{-5(1-T)^2}$  ▷ Ramp up $\lambda$ for $T \in [0, 1]$.
    $\theta \leftarrow \theta - \nabla_\theta \mathcal{L}$  ▷ Update $\theta$ via gradient descent.
    $\bar\theta \leftarrow \alpha\bar\theta + (1-\alpha)\theta$  ▷ Update $\bar\theta$ via EMA.
  end
end
return $\theta, \bar\theta$

FIGURE 8

| MatterportLayout (4-18 Corners) | 3D IoU (%) ↑ | | | | |
|---|---|---|---|---|---|
| Method | 50 labels 1,837 images | 100 labels 1,837 images | 200 labels 1,837 images | 400 labels 1,837 images | 1,650 labels 1,837 images |
| HorizonNet | 63.44 ± 0.56 | 68.79 ± 0.49 | 72.25 ± 0.50 | 74.46 ± 0.35 | 79.12 ± 0.37 |
| SSLayout360 | 67.42 ± 0.24 | 72.37 ± 0.35 | 75.31 ± 0.37 | 77.09 ± 0.41 | 80.33 ± 0.48 |
| | 2D IoU (%) ↑ | | | | |
| Method | 50 labels 1,837 images | 100 labels 1,837 images | 200 labels 1,837 images | 400 labels 1,837 images | 1,650 labels 1,837 images |
| HorizonNet | 67.17 ± 0.65 | 72.06 ± 0.49 | 75.16 ± 0.53 | 77.15 ± 0.36 | 81.54 ± 0.31 |
| SSLayout360 | 71.03 ± 0.28 | 75.46 ± 0.36 | 78.05 ± 0.33 | 79.67 ± 0.40 | 82.54 ± 0.51 |
| | $\delta_1$ ↑ | | | | |
| Method | 50 labels 1,837 images | 100 labels 1,837 images | 200 labels 1,837 images | 400 labels 1,837 images | 1,650 labels 1,837 images |
| HorizonNet | 0.76 ± 0.01 | 0.84 ± 0.01 | 0.89 ± 0.01 | 0.91 ± 0.01 | 0.94 ± 0.01 |
| SSLayout360 | 0.81 ± 0.01 | 0.89 ± 0.01 | 0.91 ± 0.01 | 0.93 ± 0.01 | 0.95 ± 0.01 |
| | RMSE ↓ | | | | |
| Method | 50 labels 1,837 images | 100 labels 1,837 images | 200 labels 1,837 images | 400 labels 1,837 images | 1,650 labels 1,837 images |
| HorizonNet | 0.41 ± 0.01 | 0.34 ± 0.01 | 0.30 ± 0.01 | 0.28 ± 0.01 | 0.23 ± 0.01 |
| SSLayout360 | 0.35 ± 0.01 | 0.29 ± 0.01 | 0.27 ± 0.01 | 0.25 ± 0.01 | 0.22 ± 0.01 |

FIGURE 11

SEMI-SUPERVISED LAYOUT ESTIMATION OF INTERIOR SPACES FROM PANORAMA IMAGES

CROSS-REFERENCE TO RELATED APPLICATIONS

This application is a continuation application claiming priority under 35 U.S.C. § 120 to U.S. patent application Ser. No. 17/401,912, filed 13 Aug. 2021, which claims priority to U.S. Provisional Application No. 63/157,448, filed on Mar. 5, 2021. The contents each are incorporated herein by reference as if fully set forth.

TECHNICAL FIELD

Various embodiments concern computer programs and associated computer-implemented techniques for establishing the layouts of interior spaces.

BACKGROUND

To establish the layout of an interior space of a building, its dimensions are normally measured using implements such as tape measures, yard sticks, rulers, and the like. These implements are useful for measuring the linear distance between a first location and a second location in Euclidean space (e.g., along a plane) along a straight line. There are several notable downsides to using these implements, however. Measuring not only tends to be inconsistent due to the reliance on the persons(s) using the implement, but can also be difficult when portions of the interior space are occluded or occupied (e.g., by furniture).

There have been several attempts to address these downsides through the development of computer programs that can be executed by mobile computing devices (or simply "computing devices"). In fact, the task of inferring the layout from digital images of an interior space has been gaining attention from the computer vision community over the past several years. Several entities have made substantial progress toward accurate reconstruction of layouts by adopting large, powerful computer-implemented models (or simply "models") powered by deep neural networks for representation learning. However, there are several challenges in acquiring the vast quantities of annotations needed to train these deep neural networks in a supervised manner. As an example, it is difficult to consistently annotate cluttered scenes with ambiguous boundaries, especially in interior spaces with complex layouts that contain many junctures. As another example, annotations can be imprecise and inconsistent due to the subjective nature of decision making by labelers (also referred to as "reviewers" or "graders"). The lack of large-scale annotated data (also referred to as "labeled data") with precise layout annotations for digital images—and particularly panoramas images (or simply "panoramas")—further hinders improvement.

At the same time, there has been flourishing research on deep semi-supervised learning (SSL) approaches that leverage abundant unlabeled data for enhanced learning in settings where limited labeled data is available. The success of these deep SSL approaches has been demonstrated on image classification, where the labeling procedure is a binary indication of the presence or absence of a given object class. These deep SSL approaches have not been extended outside of image classification to more challenging tasks, however.

BRIEF DESCRIPTION OF THE DRAWINGS

The patent or application file contains at least one drawing executed in color. Copies of this patent or patent application publication with color drawing will be provided by the Office upon request and payment of the necessary fee.

FIG. 5 includes a flow diagram of a process for facilitating a guided procedure for modeling an interior space using an inspection platform that is executing on a computing device.

FIG. 7 includes an exemplary architecture of a neural architecture in accordance with some embodiments of the technology.

FIG. 8 includes an algorithmic overview of the neural architecture shown in FIG. 7.

FIG. 11 includes a table with non-cuboid results for the HorizonNet network and the neural architecture described herein in the context of the MatterportLayout dataset.

Figure 1:
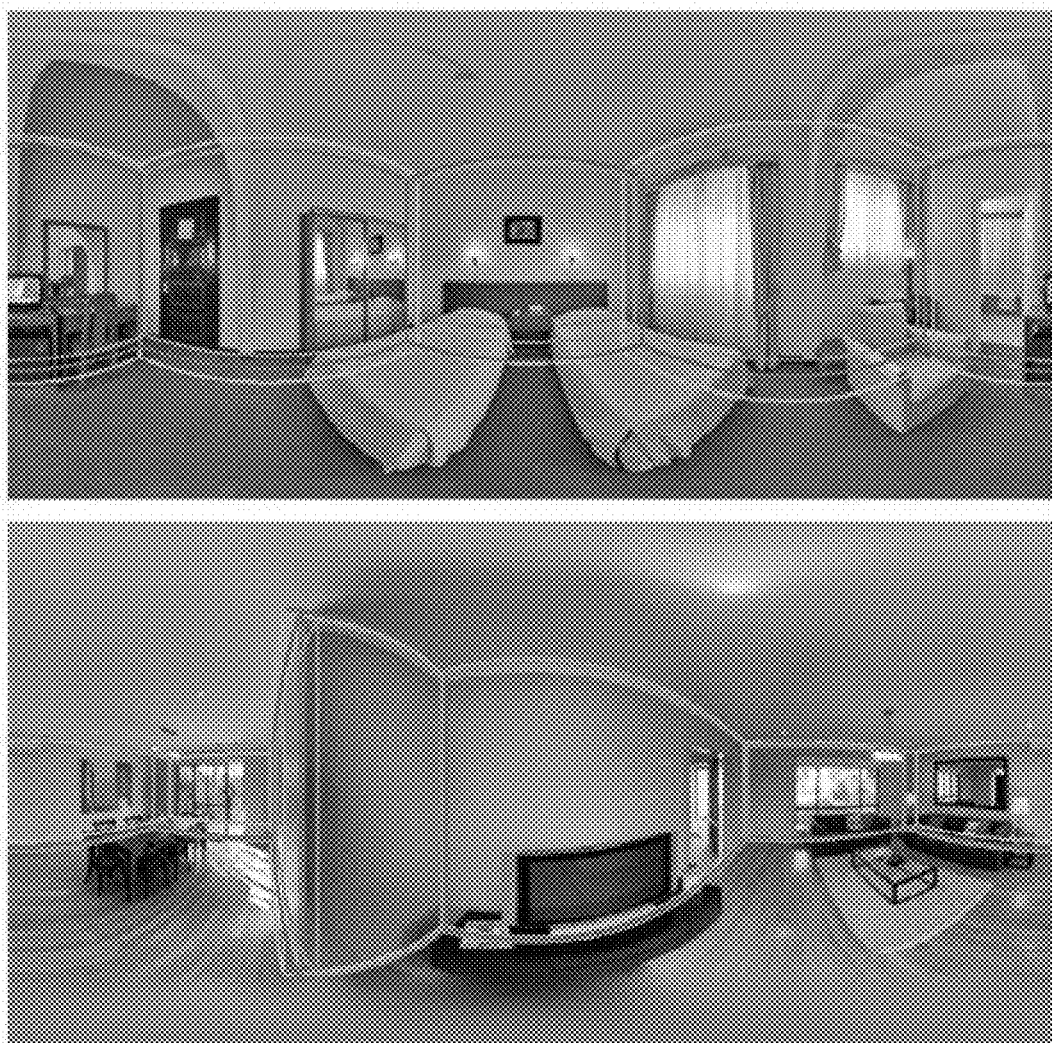
FIG. 1 illustrates how the effective use of unlabeled data can improve estimation of complex layouts in settings where limited labeled data is available.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, although specific embodiments are shown in the drawings, the technology is amenable to various modifications.

DETAILED DESCRIPTION

Introduced here are computer programs that are able to model interior spaces. These computer programs are trained to accomplish this without using extensive sets of labeled data. Instead, these computer programs are able to effectively use unlabeled data to accurately model interior spaces in settings where limited labeled data is available. Note that the term "interior space" may refer to a three-dimensional space that is enclosed by a floor, ceiling, and walls. The term "interior space" may be used interchangeably with the terms "room" and "indoor scene." Note that an interior space need not be completely bounded by walls on all sides, as the teachings of the present disclosure can be applied to interior spaces that are partially or fully enclosed by walls.

A semi-supervised approach to modeling interior spaces can be employed by these computer programs as further discussed below. In this semi-supervised approach, representations of junctures are learned using a combination of labeled and unlabeled data for improved estimation of layouts from panoramic scenes. The term "juncture" may refer to floor-wall, ceiling-wall, and wall-wall boundaries where a pair of surfaces join, intersect, or otherwise merge or converge with one another. Thus, while embodiments may be described in the context of a room with four 90-degree corners for the purpose of illustration, the technology described herein is similarly applicable to other junctures. Thus, the term "juncture" is intended to cover boundaries where the surfaces form acute, obtuse, or reflex angles, so the teachings of the present disclosure are applicable to interior spaces regardless of their particular configuration.

Extensive experimentation has shown that layout estimation of complex interior spaces by this semi-supervised model can be improved using as few as 20 labeled examples. When coupled with a layout predictor module (also referred to as a "layout predictor" or "predictor module") that is trained on synthetic data, the semi-supervised model has been shown to match performance of a fully supervised counterpart using a small number (e.g., 12 percent) of the labeled examples. The semi-supervised approach described herein represents an important step towards gaining a holistic understanding of interior spaces that can enable structured modeling of physical environments. This is important as robust layout estimation has many applications in two-dimensional (2D) and three-dimensional (3D) environments, such as homes and businesses, for which limited labeled data is available.

FIG. 1 illustrates how the effective use of unlabeled data can improve estimation of complex layouts in settings where limited labeled data is available. In FIG. 1, the boundary lines predicted by a state-of-the art fully supervised model are shown in cyan, while the boundary lines predicted by the semi-supervised model are shown in magenta. As can be seen in FIG. 1, the boundary lines predicted by the semi-supervised model align more closely with the ground truth—shown in green—after using 100 labeled examples for training. Employing a semi-supervised model in the context of layout estimation presents an opportunity to improve the results with few labeled examples.

Embodiments may be described in the context or executable instructions for the purpose of illustration. However, those skilled in the art will recognize that aspects of the technology could be implemented via hardware, firmware, or software. As an example, a computer program that is representative of a software-implemented inspection platform (or simply "inspection platform") designed to facilitate measuring, modeling, and examining of interior spaces may be executed by the processor of a computing device. This computer program may interface, directly or indirectly, with hardware, firmware, or other software implemented on the computing device. For instance, this computer program may interact with a camera that generates a panorama of the interior space, a motion sensor that generates values indicative of motion of the computing device, etc.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The term "based on" is to be construed in an inclusive sense rather than an exclusive sense. That is, in the sense of "including but not limited to." Thus, unless otherwise noted, the term "based on" is intended to mean "based at least in part on."

The terms "connected," "coupled," and variants thereof are intended to include any connection or coupling between two or more elements, either direct or indirect. The connection or coupling can be physical, logical, or a combination thereof. For example, elements may be electrically or communicatively coupled to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing all tasks.

When used in reference to a list of multiple items, the word "or" is intended to cover all of the following interpretations: any of the items in the list, all of the items in the list, and any combination of items in the list.

Overview of Inspection Platform

Figure 2:
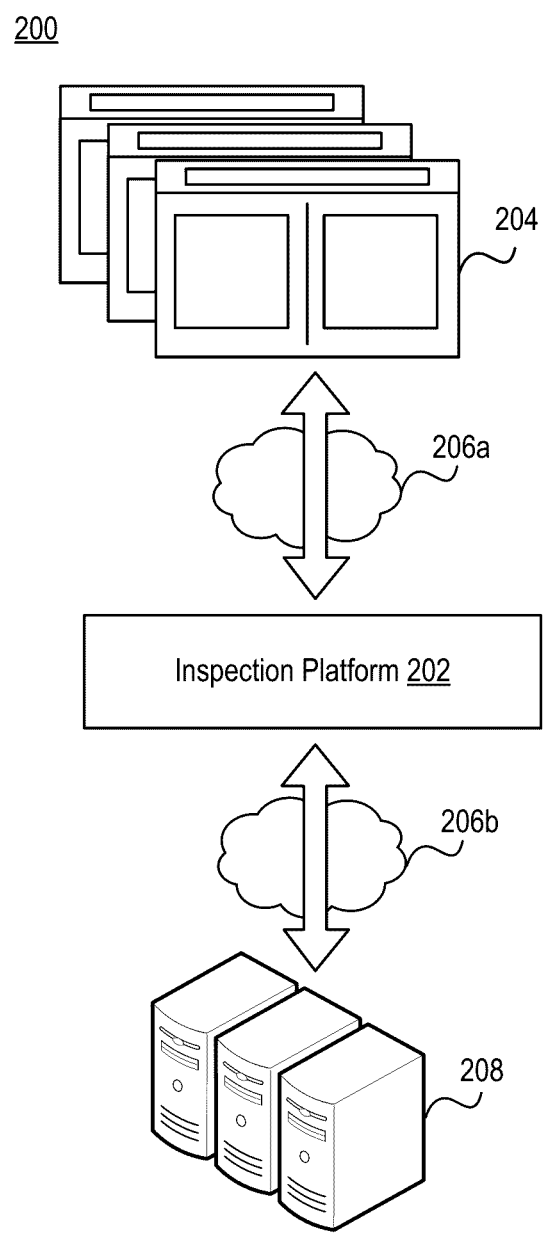
FIG. 2 illustrates a network environment that includes an inspection platform.

FIG. 2 illustrates a network environment 200 that includes an inspection platform 202. Individuals (also referred to as "users") can interface with the inspection platform 202 via interfaces 204. For example, a user may be able to access an interface through which information regarding an interior space can be input. As another example, a user may be able to access an interface through which feedback is provided as digital images (e.g., panoramas) of an interior space are generated. These interfaces 204 may also permit users to view 2D and 3D representations of interior spaces, as well as manage preferences. The term "user," as used herein, may refer to a homeowner, business owner, assessor insurance adjuster (also referred to as a "claims adjuster"), or another individual with an interest in the layout of an interior space.

As shown in FIG. 2, the inspection platform 202 may reside in a network environment 200. Thus, the computing device on which the inspection platform 202 is implemented may be connected to one or more networks 206a-b. These networks 206a-b may be personal area networks (PANS), local area networks (LANs), wide area networks (WANs), metropolitan area networks (MANs), cellular networks, or the Internet. Additionally or alternatively, the inspection platform 202 can be communicatively coupled to one or more computing devices over a short-range wireless connectivity technology, such as Bluetooth®, Near Field Communication (NFC), Wi-Fi® Direct (also referred to as "Wi-Fi P2P"), and the like.

The interfaces 204 may be accessible via a web browser, desktop application, mobile application, or over-the-top (OTT) application. For example, in order to complete the guided layout estimation procedure further described below, a user may access an interface that is generated by a mobile application executing on a mobile phone. This interface may also be accessible via the web browser executing on the mobile phone. Accordingly, the interfaces 204 may be viewed on a mobile phone, a tablet computer, a wearable electronic device (e.g., a watch or fitness accessory), or a virtual or augmented reality system (e.g., a head-mounted display).

In some embodiments, at least some components of the inspection platform 202 are hosted locally. That is, part of the inspection platform 202 may reside on the computing device that is used to access the interfaces 204. For example, the inspection platform 202 may be embodied as a mobile application that is executable by a mobile phone. Note, however, that the mobile application may be communicatively connected to a server system 208 on which other components of the inspection platform 202 are hosted.

In other embodiments, the inspection platform 202 is executed entirely by a cloud computing service operated by, for example, Amazon Web Services®, Google Cloud Platform™, or Microsoft Azure®. In such embodiments, the inspection platform 202 may reside on a server system 208 that is comprised of one or more computer servers. These computer server(s) can include different types of data (e.g., spatial coordinates, dimensions, digital images), algorithms for processing the data, property information (e.g., address, construction date, construction material, insurance provider), and other assets. Those skilled in the art will recognize that this information could also be distributed amongst the server system 208 and one or more computing devices. For example, some data that is generated by the computing device on which the inspection platform 202 resides may be stored on, and processed by, that computing device for security or privacy purposes.

Figure 3:
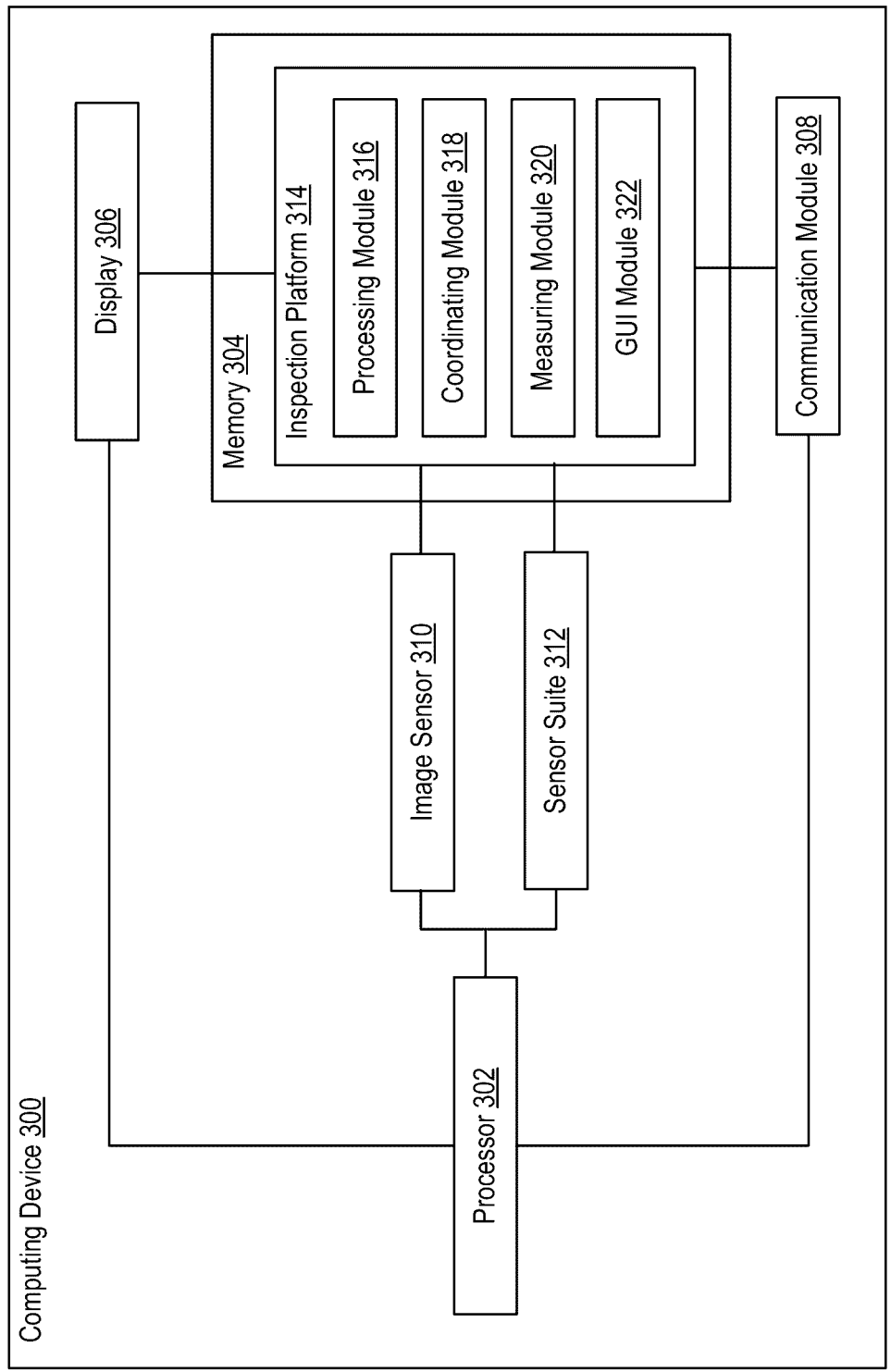
FIG. 3 illustrates an example of a computing device that is able to implement an inspection platform designed to establish the layout of an interior space.

FIG. 3 illustrates an example of a computing device 300 that is able to implement an inspection platform 314 designed to establish the layout of an interior space. The inspection platform 314 can establish the layout based on an analysis of digital image(s) of the interior space. As further discussed below, these digital image(s) can be acquired during a guided measurement procedure in which a user is prompted to pan the computing device 300 to capture a panorama of the interior space. The term "panorama" may be used to refer to a digital image that represents a wide view of the interior space. Normally, panoramas offer an unbroken view of at least a 180 degree field of view (FOV) along the horizontal plane, though panoramas could offer an unbroken view of a 360 degree FOV along the horizontal plane. Through analysis of a panorama, the inspection platform 314 may be able to determine locations of junctures that correspond to the periphery of the interior space and then infer the layout based on those locations.

The computing device 300 can include a processor 302, memory 304, display 306, communication module 308, image sensor 310, and sensor suite 312. Each of these components is discussed in greater detail below. Those skilled in the art will recognize that different combinations of these components may be present depending on the nature of the computing device 300.

The processor 302 can have generic characteristics similar to general-purpose processors, or the processor 302 may be an application-specific integrated circuit (ASIC) that provides control functions to the computing device 300. As shown in FIG. 3, the processor 302 can be coupled to all components of the computing device 300, either directly or indirectly, for communication purposes.

The memory 304 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 302, the memory 304 can also store data generated by the processor 302 (e.g., when executing the modules of the inspection platform 314). Note that the memory 304 is merely an abstract representation of a storage environment. The memory 304 could be comprised of actual memory chips or modules.

The display 306 can be any mechanism that is operable to visually convey information to a user. For example, the display 306 may be a panel that includes light-emitting diodes (LEDs), organic LEDs, liquid crystal elements, or electrophoretic elements. In some embodiments, the display 306 is touch sensitive. Thus, a user may be able to provide input to the inspection platform 314 by interacting with the display 306.

The communication module 308 may be responsible for managing communications between the components of the computing device 300, or the communication module 308 may be responsible for managing communications with other computing devices (e.g., server system 208 of FIG. 2). The communication module 308 may be wireless communication circuitry that is designed to establish communication channels with other computing devices. Examples of wireless communication circuitry include integrated circuits (also referred to as "chips" configured for Bluetooth, Wi-Fi, NFC, and the like.

The image sensor 310 may be any electronic sensor that is able to detect and convey information in order to generate image data. Examples of image sensors include charge-coupled device (CCD) sensors and complementary metal-oxide semiconductor (CMOS) sensors. The image sensor 310 may be implemented in a camera module (or simply "camera") that is implemented in the computing device 300. In some embodiments, the image sensor 310 is one of multiple image sensors implemented in the computing device 300. For example, the image sensor 310 could be included in front- or rear-facing camera on a mobile phone.

Other sensors may also be implemented in the computing device 300. Collectively, these sensors may be referred to as the "sensor suite" 312 of the computing device 300. For example, the computing device 300 may include a motion sensor whose output is indicative of motion of the computing device 300 as a whole. Examples of motion sensors include multi-axis accelerometers and gyroscopes. As another example, the computing device 300 may include a proximity sensor whose output is indicative of proximity of the computing device 300 to a nearest obstruction within the field of view of the proximity sensor. A proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. As another example, the computing device 300 may include an ambient light sensor whose output is indicative of the amount of light in the ambient environment.

For convenience, the inspection platform 314 is referred to as a computer program that resides within the memory 304. However, the inspection platform 314 could be comprised of software, firmware, or hardware that is implemented in, or accessible to, the computing device 300. In accordance with embodiments described herein, the inspection platform 314 may include a processing module 316, coordinating module 318, locating module 320, and graphical user interface (GUI) module 322. Each of these modules can be an integral part of the inspection platform 314. Alternatively, these modules can be logically separate from the inspection platform 314 but operate "alongside" it. Together, these modules enable the inspection platform 314 to establish the layout of an interior space by guiding a user through a measurement procedure.

The processing module 316 can process data obtained by the inspection platform 314 into a format that is suitable for the other modules. For example, the processing module 316 may apply operations to digital images (e.g., panoramas) generated by the image sensor 310 in preparation for analysis by the other modules of the inspection platform 314. Thus, the processing module 316 may despeckle, denoise, or otherwise filter digital images generated by the image sensor 310. Additionally or alternatively, the processing module 316 may adjust the properties like contrast, saturation, and gain in order to improve the outputs produced by the other modules of the inspection platform 314. As another example, the processing module 316 may apply operations to outputs produced by the sensor suite 312 in preparation for analysis by the other modules of the inspection platform 314. Accordingly, the processing module 316 may be responsible for ensuring that the appropriate data is accessible to the other modules of the inspection platform 314.

The coordinating module 318 may be responsible for determining and/or cataloguing the locations of junctures. Assume, for example, that a user is interested in establishing the layout of an interior space. The periphery of the interior space may be defined by junctures, each of which represents a location where at which a pair of surfaces are joined. In order to "map" the periphery of the interior space, the inspection platform 314 may request that the user locate the computing device 300 in a certain position (e.g., proximate the center of the interior space) and then capture a panorama of the interior space by panning the computing device 300. The coordinating module 318 may be responsible for determining, based on an analysis of the panorama, where the junctures of the interior space are located. As further discussed below, this can be accomplished by applying a trained model to the panorama. The trained model may produce, as output, coordinates indicating where a juncture is believed to be located based on pixel-level examination of the panorama. Normally, the trained model will produce a series of outputs that are representative of different junctures of the interior space. Using the series of outputs, the coordinating module 318 can "reconstruct" the interior space, thereby establishing its layout. In some embodiments, outputs produced by the sensor suite 312 are used to facilitate the process. For example, an output produced by a motion sensor or proximity sensor may allow the coordinating module 318 to gain greater insight into where the computing device 300 is located in the interior space (and thus how to establish the layout).

The measuring module 320 can examine the locations of junctures determined by the coordinating module 318 in order to derive insights into the interior space. For example, the measuring module 320 may calculate a dimension of the interior space based on a comparison of multiple locations (e.g., a width defined by a pair of wall-wall boundaries, or a height defined by the floor-wall and ceiling-wall boundaries). As another example, the measuring module 320 may generate a 2D or 3D layout using the locations. Thus, the measuring module 320 may be able to construct a 2D or 3D model of the interior space based on insights gained through analysis of a single panorama. In some embodiments, the measuring module 320 is also responsible for cataloging the locations of junctures determined by the coordinating module 318. Thus, the measuring module 320 may store the locations in a data structure that is associated with either the interior space or the building of which the interior space is a part. Information derived by the measuring module 320, such as dimensions and layouts, can also be stored in the data structure. In some embodiments each location is represented using a coordinate system (e.g., a geographic coordinate system such as the Global Positioning System) that is associated with real-world positions, while in other embodiments each location is represented using a coordinate system that is associated with the surrounding environment. For example, the location of each juncture may be defined with respect to the location of the computing device 300.

The GUI module 322 may be responsible for generating interfaces that can be presented on the display 306. Various types of information can be presented on these interfaces. For example, information that is calculated, derived, or otherwise obtained by the coordinating module 318 and/or measuring module 320 may be presented on an interface for display to the user. As another example, visual feedback may be presented on an interface so as to indicate to the user whether the measurement procedure is being completed properly.

Methodologies for Semi-Supervised Layout Estimation of Interior Spaces

Figure 4:
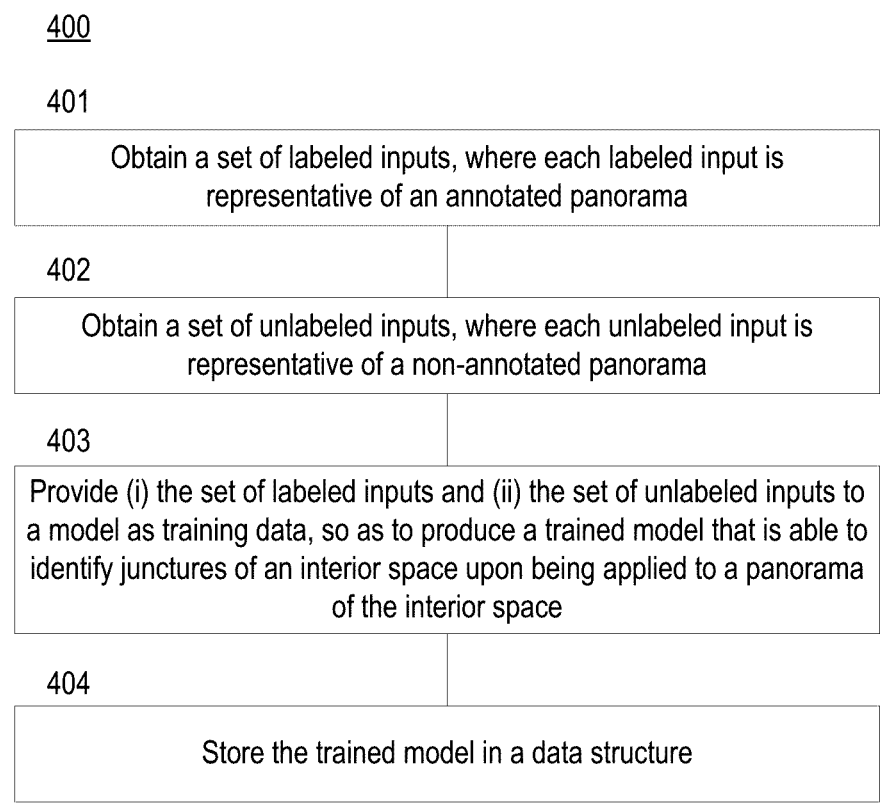
FIG. 4 includes a flow diagram of a process for training a model in a semi-supervised manner to identify the locations of junctures in an interior space based on an analysis of the pixel data of a digital image.
Figure 6:
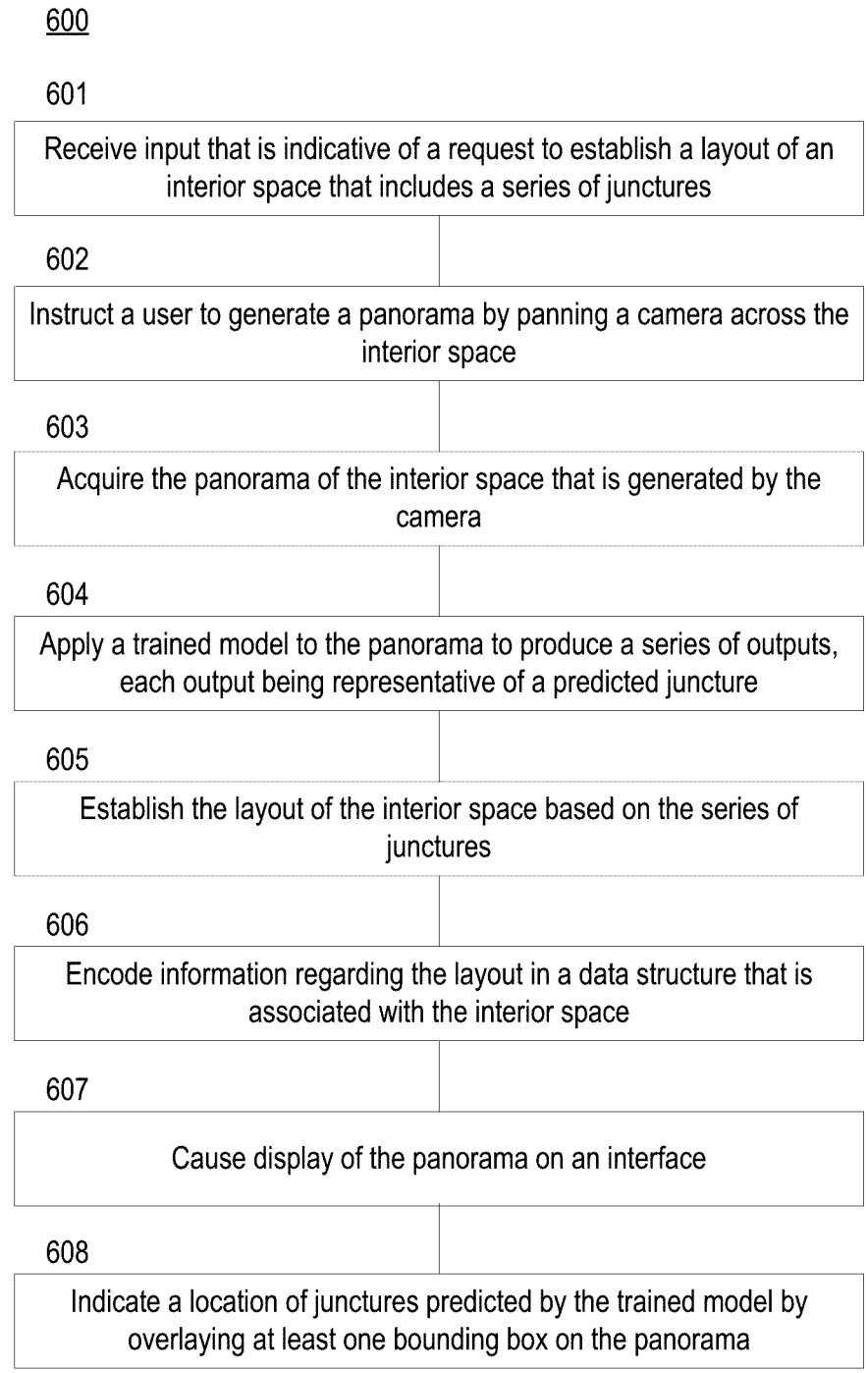
FIG. 6 includes a flow diagram of another process for facilitating a guided procedure for modeling an interior space using an inspection platform that is executing on a computing device.

FIG. 4 includes a flow diagram of a process 400 for training a model in a semi-supervised manner to identify the locations of junctures in an interior space based on an analysis of the pixel data of a digital image. For the purpose of illustration, the processes of FIGS. 4-6 are described in the context of a panorama; however, those skilled in the art will recognize that the processes may be similarly applicable to digital images that are not wide-angle representations of a physical space. Also, while the processes are described in the context of identifying the locations of junctures in an interior space, those skilled in the art will recognize that the processes may be similarly applicable to establishing the layouts of exterior spaces.

Initially, an inspection platform can obtain a set of labeled inputs (step 401). Each labeled input may be representative of an annotated panorama that includes at least one label indicating where a juncture is located in the annotated panorama. Thus, the set of labeled inputs may be representative of a set of annotated panoramas that have been labeled by one or more annotators (also referred to as "reviewers" or "graders") who are responsible for specifying where junctures are located. The inspection platform can also obtain a set of unlabeled inputs (step 402). Each unlabeled input may be representative of a non-annotated panorama that does not include any labels. The inspection platform may obtain the set of unlabeled inputs in response to receiving input indicative of a selection of a source from which to acquire the set of unlabeled inputs. Similarly, the inspection platform may obtain the set of labeled inputs in response to receiving input indicative of a selection of a source from which to acquire the set of labeled inputs.

In some embodiments, the set of labeled inputs and the set of unlabeled inputs are sampled from different data distributions. For example, the set of labeled inputs may be associated with a first set of interior spaces while the set of unlabeled inputs may be associated a second set of interior spaces that does not share any interior spaces in common with the first set of interior spaces. In embodiments where different data distributions are used, the set of labeled inputs may be obtained from a first source while the set of unlabeled inputs may be obtained from a second source different than the first source.

In other embodiments, the set of labeled inputs and the set of unlabeled inputs are sampled from the same data distribution. Said another way, the set of labeled inputs and the set of unlabeled inputs may be sampled from a single data distribution. In such embodiments, the set of labeled inputs may be representative of a labeled subset of the set of unlabeled inputs. Thus, the inspection platform may receive a first input indicative of a selection of a set of non-annotated panorama images to be used as the set of unlabeled inputs. Then, the inspection platform may receive a second input that specifies or identifies labels for a subset of those non-annotated panorama images. The subset of non-annotated panorama images for which labels have been provided may serve as the set of annotated panorama images to be used as the set of labeled inputs.

Thereafter, the inspection platform can provide (i) the set of labeled inputs and (ii) the set of unlabeled inputs to a model as training data, so as to produce a trained model that is able to identify junctures of an interior space upon being applied to a panorama of the interior space (step 403). At a high level, the trained model may be configured to encode, at each row or column of a panorama to which it is applied, positions of the junctures of the interior space captured in the panorama. Thus, the trained model may output a matrix with values that indicate whether the corresponding pixel in the panorama corresponds to a juncture. Each value in the matrix may correspond to a separate pixel in the panorama. Alternatively, the trained model may output a series of vectors with values that indicate whether the corresponding pixel in the panorama corresponds to a juncture. Each vector may correspond to a row or column of pixels in the panorama.

As further discussed below, the model may be a machine learning (ML) model that can be trained in a semi-supervised manner using labeled and unlabeled examples. For example, the model may be based on a stochastic neural network. The term "neural network" may be used to refer to a series of computational units (referred to as "nodes") that are interconnected via links, which are assigned weights to indicate the strength of the influence of one node on another node. Stochastic neural networks, meanwhile, are a type of neural network that is built by introducing random variations into the neural network, either by assigning stochastic transfer functions to the nodes or assigning stochastic weights to the nodes. This makes stochastic neural networks useful for addressing optimization problems since the random fluctuations can help the neural networks avoid getting "stuck" (and achieve results that non-stochastic algorithms cannot).

In some embodiments, the inspection platform selects the model from amongst a series of untrained models based on the labeled or unlabeled inputs. For example, the inspection platform may select the model based on the complexity of the corresponding annotated and non-annotated panorama images, or the inspection platform may select the model based on the type of room that the model is to be trained to examine (e.g., as determined based on an analysis of the annotated and non-annotated panorama images). Additionally or alternatively, the inspection platform may select the model from amongst the series of untrained models based on the nature of the environment in which the model, when trained, is expected to be applied. For example, the inspection platform may select a "lightweight" model that does not consume substantial computational resources if the model is to be deployed on mobile phones (e.g., applied by mobile applications executing on those mobile phones). As another example, the inspection platform may select a "heavyweight" model that consumes more substantial computational resources if the model is to be deployed on a network-accessible server system (e.g., to which mobile applications executing on mobile phones are able to transmit panorama images for analysis).

The inspection platform can then store the trained model in a data structure (step 404). As discussed above, the data structure may reside in a memory that is located in the computing device on which the inspection platform resides, or the data structure may reside in a memory that is accessible to the computing device via a network. The trained model may be one or multiple trained models stored in the data structure. These trained models may be designed to identify junctures in different types of rooms, under different conditions, etc. For example, the inspection platform could train multiple models for different room configurations (e.g., simple 4-corner configurations and more complex configurations with 5, 6, 8, or 10 corners). As another example, the inspection platform could train multiple models for different room types (e.g., a first model for bathroom, a second model for bedroom, a third model for living room, etc.). Accordingly, each trained model may be trained using different sets of labeled and unlabeled inputs. Moreover, each training model may be associated with an identifier that conveys information regarding the nature of the rooms for which it is suitable. For example, the inspection platform may store the trained model in a data structure as mentioned above. The inspection platform may indicate the rooms for which the trained model is suitable in the data structure using, for example, a term (e.g., "bathroom" or "4-corner room") that serves as a title or alphanumeric identifier that uniquely identifies the trained model amongst all trained models stored in the data structure.

FIG. 5 includes a flow diagram of a process 500 for facilitating a guided procedure for modeling an interior space using an inspection platform that is executing on a computing device. Initially, the inspection platform will receive input that is indicative of a request to establish the layout of an interior space that includes a series of junctures, each of which represents a point at which a different pair of surfaces are joined (step 501). As mentioned above, these junctures may be representative of floor-wall, ceiling-wall, or wall-wall boundaries. Normally, this input corresponds to a user either initiating (i.e., opening) the inspection platform or interacting with the inspection platform in such a manner so as to indicate that she is interested in estimating the layout. For example, the user may interact with a digital element labeled "Model Room" or "Estimate Layout" that is viewable on an interface generated by the inspection platform. Alternatively, this input could correspond to an instruction that is provided by either a server system to which the computing device is connected or the computing device itself. For example, the server system may transmit an instruction to initiate the guided procedure to the inspection platform responsive to a determination that certain conditions have been met, the user has indicated a willingness to complete the guided procedure, etc.

In some embodiments, a user may be able to indicate whether she is interested in establishing a 2D or 3D layout of the interior space. If the user is interested in establishing a 2D layout of the interior space, the inspection platform may only catalogue, store, or otherwise record information regarding wall-wall boundaries. Conversely, if the user is interested in establishing a 3D layout of the interior space, the inspection platform may catalogue, store, or otherwise record information regarding floor-wall, ceiling-wall, and wall-wall boundaries.

The inspection platform can then instruct the user to generate a panorama by panning the computing device while a camera generates one or more digital images of the interior space (step 502). To generate a panorama, the computing device will normally generate at least two digital images of the interior space and then "stitch" those digital images together to create the panorama. Accordingly, the panorama may be representative of multiple digital images with overlapping portions that are joined together—usually by the operating system of the computing device—to collectively represent the interior space.

Then, the inspection platform can apply a trained model to the panorama to produce an output that is representative of a juncture predicted by the trained model based on an analysis of the panorama (step 503). For example, the trained model may output a matrix in which each entry indicates whether the corresponding pixel corresponds to a juncture. If an entry indicates that the corresponding pixel does correspond to a juncture, the value may also indicate which type of juncture (e.g., whether the juncture is representative of a floor-wall, ceiling-wall, or wall-wall boundary). With these values, the inspection platform may be able to define the juncture in the context of the panorama, for example, by identifying which pixels correspond to the juncture.

Moreover, the inspection platform may cause display of at least a portion of the panorama with a graphical element overlaid thereon to indicate a location of the juncture that is predicted by the trained model (step 504). Normally, the output is one of a series of outputs produced by the trained model, each of which is representative of a separate juncture that is predicted by the trained model based on an analysis of the panorama. Accordingly, while each juncture may be represented using a line that overlays the panorama, the panorama may have one or more bounding boxes overlaid thereon as shown in FIG. 1. Each bounding box may have four sides, namely, a first side that is representative of the floor-wall boundary, a second side that is representative of the ceiling-wall boundary, and third and fourth sides that are representative of wall-wall boundaries. In a spatial sense, the first and second sides are normally roughly parallel to one another and roughly orthogonal to the third and fourth sides. However, the bounding box may not be rectangular due to the distortion of the panorama. As can be seen in FIG. 1, the bounding boxes that define the walls of an interior space tend to "bulge" along at least one side.

Graphical elements may be overlaid on the panorama after the panorama has been fully captured, or graphical elements may be overlaid on the panorama as the panorama is being captured. For example, while the user pans the computing device so that the periphery of the interior space can be viewed by the camera, the panorama may be shown on the display. In such embodiments, the inspection platform may apply the trained model to the panorama in real time (e.g., to columns of pixels) and then populate graphical elements as appropriate.

The inspection platform may also be able to establish the layout of the interior space based on the outputs produced by the trained model (step 505). As mentioned above, the outputs may be representative of junctures that are predicted by the trained model based on an analysis of the panorama. For each juncture, the inspection platform may infer, predict, or otherwise establish a spatial position in the context of a coordinate system (e.g., defined with respect to the interior space). With these spatial positions, the inspection platform can determine the layout of the interior space. Thereafter, the inspection platform may encode information regarding the layout in a data structure that is associated with the interior space (step 506). For example, the inspection platform may encode the spatial positions of the junctures, the dimensions of the walls, the height of the ceiling, etc. The data structure is normally stored in a memory that is internal to the computing device on which the inspection platform is executing. However, the inspection platform could alternatively or additionally cause transmission of the data structure to a destination external to the computing device (step 507). For example, the data structure could be transmitted to another computing device (e.g., server system 208 of FIG. 2) to which the computing device is communicatively connected.

FIG. 6 includes a flow diagram of another process 600 for facilitating a guided procedure for modeling an interior space using an inspection platform that is executing on a computing device. Initially, the inspection platform may receive input that is indicative of a request from a user to establish the layout of an interior space that includes a series of junctures (step 601), each of which represents a point at which a different pair of surfaces are joined. Consider, for example, a rectangular room with four 90-degree corners. This rectangular room comprises various junctures of different types. There are four wall-wall boundaries at which different pairs of walls join together. Along each wall, there is also a floor-wall boundary and a ceiling-wall boundary. Together, these various junctures define the periphery of the interior space from a 3D perspective.

Thereafter, the inspection platform may instruct the user to generate a panorama by panning the camera across the interior space (step 602). This can be accomplished using the camera housed in a computing device that is associated with the user. In some embodiments the inspection platform resides on the computing device, while in other embodiments the inspection platform resides on another computing device to which the computing device is communicatively connected. In embodiments where the inspection platform resides on the computing device associated with the user, the inspection platform may configure a capture session so that the panorama is made available by the operating system after being generated by the camera. For instance, the inspection platform may cause the capture session to be customized by configuring a capture parameter of the camera based on a characteristic of the interior space. As an example, the resolution, focus, or flash could be altered based on the ambient light level, distance to wall, location in interior space, etc. These characteristics of the interior space may be determined based on an output produced by a sensor included in a sensor suite (e.g., sensor suite 312 of FIG. 3) of the computing device.

The inspection platform can then acquire the panorama of the interior space that is generated by the camera (step 603). In embodiments where the inspection platform resides on the computing device that was used to capture the panorama, the inspection platform may obtain the panorama directly from the operating system. Alternatively, the inspection platform may receive the panorama from across a network (e.g., via communication module 308 of FIG. 3). Thereafter, the inspection platform can apply a trained model to the panorama to produce a series of outputs (step 604). Each output in the series of outputs may be representative of a juncture that is predicted by the trained model based on an analysis of the panorama. As further discussed below, the trained model may be configured to perform pixel-wise classification of pixel data corresponding to the panorama in a columnar manner to produce the series of outputs.

In some embodiments, the inspection platform establishes the layout of the interior space based on the series of outputs (step 605). For example, the inspection platform may calculate the dimensions of the interior space based on the series of outputs and then create a 2D floor plan for the interior space that is based on the dimensions. As another example, the inspection platform may calculate the dimensions of the interior space based on the series of outputs and then create a 3D floor plan for the interior space that is based on the dimensions. Whether the floor plan is 2D or 3D may depend on the type(s) of junctures that are predicted by the inspection platform. Moreover, the inspection platform can encode information regarding the layout in a data structure that is associated with the interior space (step 606). Step 606 of FIG. 6 may be substantially similar to step 506 of FIG. 5.

In some embodiments, the inspection platform is configured to provide feedback to the user during the capture session in which the panorama is captured. For example, the inspection platform may cause display of the panorama on an interface (step 607) and then indicate a location of each juncture that is predicted by the trained model by overlaying at least one bounding box on the panorama (step 608). As shown in FIG. 1, the perimeter of each bounding box is typically defined by a set of four outputs. Normally, the set of four outputs includes a first output representing a floor-wall boundary, a second output representing a ceiling-wall boundary, and third and fourth outputs representing different wall-wall boundaries. In some embodiments, steps 607608 are performed in near real time. Thus, bounding boxes may be overlaid on the panorama as the camera is panned across the interior space (and the panorama is presented on the display of the computing device). In other embodiments, steps 607-608 are performed after the panorama is generated. For example, steps 607-608 may be performed by the inspection platform in response to receiving input indicative of a selection of the panorama by the user.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Additional steps may also be included in some embodiments. For example, when a trained model is applied to a panorama, outputs will be produced that are representative of predicted locations of junctures. However, these predicted locations may be slightly inaccurate depending on the location of the computing device used to capture the panorama, as well as other factors such as lighting, resolution, etc. The inspection platform may attempt to limit the inaccuracy by adjusting the predicted locations. For example, the inspection platform can be configured to mathematically model the spatial locations of individual junctures (and between pairs of junctures) based on the panorama and/or outputs generated by other sensors included in the computing device.

Exemplary Framework for Semi-Supervised Layout Estimation

As mentioned above, an inspection platform can employ a framework for layout estimation. This framework may be representative of a neural architecture that is capable of learning representations of floor-wall, ceiling-wall, and wall-wall boundaries from a combination of labeled and unlabeled data. Such an approach can lead to improved layout estimation of interior spaces for which panoramas are available. Through extensive comparative experiments, this framework has been shown to achieve good results on a number of benchmarks for simple and complex layouts by using unlabeled data to augment the labeled data used for supervised learning. Coupled with a layout predictor that is pre-trained on synthetic data, this framework matches fully supervised baseline models using a small number (e.g., 12 percent) of the labeled examples.

Existing evaluation procedures for layout estimation tend to suffer from statistical unreliability, given the relatively small number of labeled examples available for training, validating, and testing. By building upon the rigorous semi-supervised learning evaluation protocol that has been adopted in the image classification domain, a comprehensive benchmark for measuring the contribution of unlabeled data to semi-supervised layout reconstruction can be established.

A. Overview of Approach

One of the goals in developing the framework for layout estimation is to combine unlabeled data with labeled data from real contexts and/or synthetic contexts in a semi-supervised setting to improve performance of layout reconstruction and estimation. For the purpose of illustration, evidence of the robustness of the framework in the context of semi-supervised layout estimation is provided below. Note that while the framework is described with reference to learning the layout of an interior space from a 360 degree panorama in a specific semi-supervised setting, this example is not intended to limit the scope of present disclosure.

FIG. 7 includes an exemplary architecture of a neural architecture in accordance with some embodiments of the technology. Meanwhile, the algorithmic overview of the neural architecture is shown in FIG. 8. Those skilled in the art should have a clear understanding of the framework by looking at FIG. 7 in conjunction with FIG. 8. The input is a set of labeled input-target pairs $(x_l, y_l) \in D_L$ and a set of unlabeled inputs $x_U \in D_U$. For convenience, $D_L$ and $D_U$ may be assumed to be sampled from the same underlying data distributions (e.g., indoor scenes), in which case $D_L$ may be a labeled subset of $D_U$. In practical applications, however, $D_L$ and $D_U$ often come from different, but somewhat related, data distributions (e.g., indoor and outdoor scenes). To improve robustness of the neural architecture, it may be desirable to learn from a broader data distribution.

To learn features that are representative of junctures, the neural network $f_\theta(x)$ can be trained using a combination of $D_L$ and $D_U$. As mentioned above, the neural network $f_\theta(x)$ may be a stochastic prediction function that is parameterized by $\theta$. This approach builds on top of a successful variant of the student-teacher model referred to as "Mean Teacher" that was originally formulated for image classification, though it has been extended to the more challenging task of layout estimation from complex panoramas of indoor scenes. At a high level, the following represents the compound objective for semi-supervised learning of the canonical form:

$$\min_\theta L_l(D_L, \theta) + \lambda L_U(D_U, \theta), \qquad \text{Eq. 1}$$

Where $L_l$ is the supervised loss over all labeled examples and $L_U$ is the unsupervised loss defined for unlabeled data. The learning objective may treat $L_U$ as a regularization term, and $\lambda > 0$ is a weight hyper-parameter that controls the strength of regularization. Equation 1 can be solved via gradient descent optimization to update $\theta$ by back-propagation of errors.

B. Semi-Supervised Layout Estimation

At a high level, the task of layout estimation boils down to inferring the location of floor-wall, ceiling-wall, and wall-wall boundaries. In this example, insights are derived from the HorizonNet network (or simply "HorizonNet") to regress layout boundaries and corners to the ground truth for each column of the panorama used as input in the semi-supervised setting. Other approaches to layout estimation that are based on pixel-wise classification (e.g., LayoutNet, DuLa-Net, CFL, and AtlantaNet) could also be extended to the semi-supervised setting.

HorizonNet was chosen as the prediction function $f_\theta(x)$ for its simplicity, efficient computation, and performance on layout estimation. The input to HorizonNet is a red-green-blue (RGB) panorama with dimensions of 3×512×1024 for channel, height, and width along with a three-channel target vector of size 3×1×1024 representing ceiling-wall ($y_c$) boundary, floor-wall ($y_f$) boundary, and wall-wall ($y_y$) boundary position of each image column. The values of $y_c$ and $y_f$ are normalized in $[-\pi/2, \pi/2]$ while $y_y$ is scaled to $[0,1]$.

HorizonNet follows an encoder-decoder approach to learn whole-room layouts from panoramas. The encoder may be the ResNet-50 architecture that is pre-trained on ImageNet, combined with a sequence of convolution layers followed by the rectifier (e.g., the Rectified Linear Unit) that serves as the activation function, to compute an abstract 1024×1×256 dimensional feature representation from the panorama provided as input. The decoder may be a bidirectional recurrent neural network that predicts $(\hat{y}_c, \hat{y}_f, \hat{y}_w) \in \mathbb{R}^{3\times1\times1024}$ column by column.

This approach to developing the neural architecture treats HorizonNet as a stochastic predictor with the dual role of being both student and teacher in a student-teacher model. Given a batch $b_L$ of labeled examples, their real-values target vectors $\hat{y}_l \in \mathbb{R}^{3\times1\times1024}$, and a batch $b_U$ of unlabeled examples at each training step, HorizonNet can be forward propagated three times: (1) on the batch of labeled examples as the student $f_\theta(x)$ using parameters $\theta$ to produce real-values prediction vectors $\hat{y}_l \in \mathbb{R}^{3\times1\times1024}$, (2) on the batch of unlabeled examples using the same parameters $\theta$ to compute $z_U \in \mathbb{R}^{3\times1\times1024}$, and (3) on the batch of unlabeled examples as the teacher $f_{\ominus}(x)$ using parameters $\ddot{\theta}$ to output $\hat{z}_U \in \mathbb{R}^{3\times1\times1024}$. Here, $\ominus$ is an exponential moving average (EMA) of the student parameters $\theta$ after taking each training step t:

$$\ddot{\ominus}_t = \alpha \ddot{\ominus}_{t-1} + (1-\alpha)\ddot{\ominus}_t, \qquad \text{Eq. 2}$$

where a $\alpha[0,1]$ is a decay hyper-parameter. The intuition for setting $\ominus$=EMA($\theta$) is to obtain a good teacher that provides stable unsupervised targets for the student to imitate. Gradients may not be back-propagated through the teacher so as to keep its prediction fixed at each training step. The alternative approach is to set $\ominus=\theta$ with $\alpha=0$ and then back-propagate gradients through the student and teacher models. However, this alternative approach has been shown to be less stable with worse performance.

C. Loss Function

The real-valued prediction vectors $\hat{y}_l$ are regressed to target vectors $y_l$ using $L_1$ distance for ($y_c, y_f$) and squared $L_2$ distance for the wall-wall boundary $y_w$. The supervised loss component, evaluated over a small batch (e.g., 5, 10, or 20) of labeled examples, can then be computed as follows:

$$L_l = \frac{1}{|b_l|} \sum_{i \in b_l} \|\hat{y}_{ic} - y_{ic}\|_1 + \|\hat{y}_{if} - y_{if}\|_1 + \|\hat{y}_{iw} - y_{iw}\|_2^2. \qquad \text{Eq. 3}$$

The supervised objective is different than HorizonNet, in that squared $L_2$ loss or Brier score is used instead of binary cross-entropy loss for the wall-wall boundary $y_w$. The Brier score is commonly used in semi-supervised learning because it is bounded and does not heavily penalize predicted probabilities far away from the ground truth. Preliminary experiments have shown that the squared $L_2$ loss gave slightly but consistently better performance in terms of accuracy than binary cross-entropy loss.

For the unsupervised loss component, $z_U$ and $\hat{z}_U$ can be constrained to be close by computing their $L_1$ distance and squared $L_2$ distances much like Eq. 3:

$$L_U = \frac{1}{|b_U|} \sum_{i \in b_U} \|z_{ic} - \hat{z}_{ic}\|_1 + \|z_{if} - \hat{z}_{if}\|_1 + \|z_{iw} - \hat{z}_{iw}\|_2^2. \qquad \text{Eq. 4}$$

It is a reasonable objective to enforce consistency on $z_u$ and $\hat{z}_u$ when $f_e(x)$ and $fp(x)$ are stochastic predictors with random dropout at each forward pass. By minimizing the discrepancy between student $z_u$ and teacher $\hat{z}_u$ predictions on unlabeled examples, the student model is encouraged to learn additional layout representations from unlabeled data via the soft unsupervised targets provided by the teacher. The compound objective for training the neural architecture on labeled and unlabeled data can be represented as the weighted sum of the supervised and unsupervised losses:

$$L = L_l + \lambda L_u. \qquad \text{Eq. 5}$$

This formulation of the neural architecture works well for layout estimation and is distinguishable from other approaches based on semi-supervised learning in that the compatibility between the supervised and unsupervised terms is maintained by applying $L_1$ and $L_2$ losses to both. Such an approach also has the benefit of removing the need to tune the weight hyper-parameter A during training. Instead, the weight hyper-parameter $\lambda$ can simply be set to 1 to obtain consistent results in all experiments across all datasets under consideration. By contrast, Mean Teacher and other methods that utilize semi-supervised learning for image classification use different loss functions for the supervised and unsupervised terms (e.g., cross entropy+$L_2$), resulting in the need to carefully tune the weight hyper-parameter $\lambda$ to manage the balance between the objectives.

Figure 9:
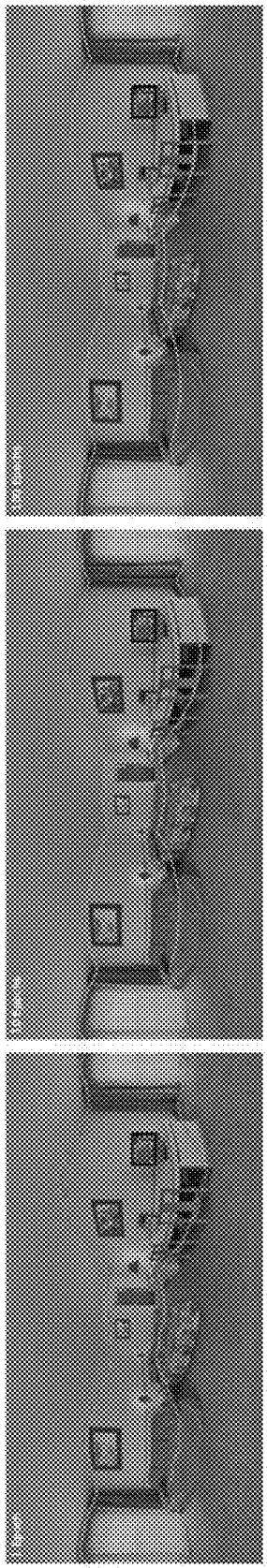
FIG. 9 illustrates how at the beginning of training, the student and teacher models are likely to produce incorrect and inconsistent predictions, especially when few labels are available.

The approach described above assumes that the teacher provides good unsupervised targets for the student to imitate. FIG. 9 illustrates how at the beginning of training, the student and teacher models are likely to produce incorrect and inconsistent predictions, especially when few labels are available. FIG. 9 includes a visualization of the evolution of HorizonNet as the student (red lines) and teacher (green lines) learn over the course of training on 100 labeled and 1,009 unlabeled panoramas. The student is encouraged to learn representations of junctures from unlabeled data by enforcing consistency and/or minimizing discrepancy between the student and teacher predictions perturbed by random noise.

A potentially degenerate solution can be mitigated by ramping up the unsupervised loss weight from 0 to 1 according to the following sigmoid-shaped function:

$$\lambda(t) = e^{-5(1-t/T)^2}, \qquad \text{Eq. 6}$$

where t is the current training iteration and T is the number of iterations at which to stop the ramp-up. In this example, T was defined to be a percentage of the maximum number of iterations, which is the product of training epochs and the cardinality of mini-batches included in the unlabeled dataset. For example, T@30% means that if the neural architecture is trained for 100 epochs over an unlabeled set of 2,000 images using a mini-batch of 4, then T@30%=0.30×

100×2000/4=15,000 iterations. The ramp-up period ensures that student learning progresses predominantly via the supervised loss on labeled data at the beginning of training up to T iterations, after which the teacher becomes reliable to provide good stable juncture predictions.

D. Experimental Setup

The neural architecture was trained and then evaluated on three challenging benchmark datasets covering simple cuboid layouts and complex non-cuboid layouts. For cuboid layout estimation, the PanoContext dataset (or simply "PanoContext") and the Stanford-2D3D dataset (or simply "Stanford-2D3D") that include 512 and 550 RGB panoramas, respectively, were used. For non-cuboid layout estimation, the MatterportLayout dataset (or simply "MatterportLayout") that comprises 2,295 RGB panoramas of indoor scenes having up to 22 wall-wall boundaries (also referred to as "corners") was used. Normal training, validating, and testing splits were used for all three datasets.

MatterportLayout is a curated, labeled subset of the larger Matterport3D dataset that comprises 10,912 RGB panoramas of general indoor and outdoor scenes, such as balconies, porches, and the like. The auxiliary Matterport3D dataset—minus 458 testing instances—of 10,454 panoramas was used as a source of extra unlabeled data to augment the semi-supervised experiments on MatterportLayout, and to evaluate the neural architecture under the condition of data distribution mismatch that includes a mixture of indoor and outdoor scenes.

Further experiments were performed with the Structured3D dataset (or simply "Structured3D"), a large pho-realistic synthetic dataset that comprises 21,835 panoramas of 3,500 diverse indoor scenes with ground truth cuboid and non-cuboid layout annotations. HorizonNet was pre-trained on 18,362 synthetic images and then tasked with performing transfer learning, on the MatterportLayout dataset via fine tuning.

E. Evaluation Protocol

Figure 10:
FIG. 10 includes a table that shows supervised performances can vary as much as 4 percent due to statistical unreliability.

Existing evaluation procedures for layout estimation suffer from statistical unreliability given the limited number of examples for training, validating, and testing. FIG. 10 includes a table that shows supervised performances can vary by as much as 4 percent. Prior attempts at developing a suitable model fell short since only point estimates without standard error bounds were reported. This makes a direct comparison to conventional methods difficult when considering statistical significance. A rigorous evaluation protocol that was previously used for semi-supervised image classification was adopted and then extended to semi-supervised layout estimation.

Supervised and semi-supervised experiments were conducted over four runs using different random seeds, and the mean and standard deviation were reported to assess statistical significance. This helps to evaluate the contributions of unlabeled data instead of confounding statistical noise that is inherent in deep neural networks (e.g., dropout, weight initialization). For semi-supervised learning, the standard practice of randomly sampling varying amounts of the training data as labeled examples while treating the combined training and validation sets, discarding all labels, as the source of unlabeled data was used. Care was taken not to include any test instances as unlabeled data. The neural architecture was trained with labeled and unlabeled data in accordance with the algorithm shown in FIG. 8, and its performance was compared to that of HorizonNet trained using only the labeled data in the traditional supervised manner.

The rigorous evaluation protocol was extended to include experiments with extra unlabeled and synthetic data, which have not been explored for layout estimation. In experiments that use synthetic data, the question to be answered was—given a strong predictor pre-trained on synthetic data, can the neural architecture bridge the performance gap between synthetic and real data by using a combination of both in a semi-supervised setting?

F. Implementation Details

The neural architecture was implemented using the PyTorch machine learning library and then trained on two NVIDIA TITAN X graphical processing units (GPUs), each with 12 gigabytes (GB) of video memory. The semi-supervised learning experiments took between 6 and 65 hours to complete depending on the number of training epochs and how much unlabeled data was used in combination with unlabeled data. The supervised HorizonNet baselines were trained using publicly available source code for direct comparison.

Initially, the input data was separated into labeled and unlabeled branches. All digital images were pre-processed by a panoramic image alignment algorithm to enforce Manhattan constraints. Then, standard panorama augmentation techniques were followed to apply random stretching in both $(k_x, k_z) \in [0.5, 2.0]$ directions, horizontal rotation $r \in [0°, 360°]$, left-right flipping with probability 0.5, and luminance change with $\gamma \in [0.5, 2.0]$ to each branch independently.

Hyper-parameters were initially configured to the supervised HorizonNet baseline, and only those specific to the neural architecture were tuned. These hyper-parameters included the unsupervised loss weight A, the ramp-up period T, and EMA decay a. In this example, the hyper-parameters were tuned on the PanoContext validation set and then fixed constant for experiments on Stanford-2D3D and MatterportLayout. An effort was made to keep the hyper-parameter configuration general to avoid overfitting on a per-dataset or per-experiment basis, which can limit the real-world applicability of the neural architecture.

The same underlying neural architecture and training protocol were used for the supervised and semi-supervised experiments, which the exception of tuning hyper-parameters specific to the neural architecture. This was done to ensure that any performance boost in the semi-supervised setting is directly attributable to the unlabeled data rather than changes in training procedure or model architecture.

The Adam optimized was employed to train HorizonNet and the neural architecture. Following HorizonNet's training protocol, a learning rate of 0.0003 and a batch size of 8 were used for the PanoContext and Stanford-2D3D experiments. For the MatterportLayout experiment, a learning rate of 0.0001 and a batch size of 4 were used to achieve the best results. The learning rate was annealed after each training step t based on the following polynomial schedule:

$$lrx(1-t/t_{max})^{0.5}. \qquad \text{Eq. 7}$$

The best models were then determined based on performance on the validation sets. At the time of testing, the neural architecture produced two sets of model parameters $\theta$ and $\ominus = \text{EMA}(\theta)$, both of which are expected to have comparable predictive accuracy. For simplicity, the average of those predictions was taken for each test instance and then results were reported.

Layout estimation performance was assessed using six standard metrics to maintain parity with previous attempts to compare different approaches. For evaluation between predicted layout and ground truth, a 3D intersection over union (IoU), 2D IoU, corner error, and pixel error were used. For evaluation between predicted layout and ground truth layout depth, a root mean squared error (RMSE) was used along with the percentage of pixels where the ratio (or its reciprocal) between the prediction and label is within a threshold of 1.25, represented as "$\delta_1$." Non-cuboid layout estimation was evaluated using 3D IoU, 2D IoU, RMSE, and $\delta_1$.

G. Results and Analysis

Quantitative evaluations on the PanoContext and Stanford-2D3D test sets are presented in FIG. 10. As can be seen in FIG. 10, the neural architecture surpasses the supervised HorizonNet baselines across most settings under consideration. For the fully supervised baseline with all labeled images, the neural architecture achieves similar performance to HorizonNet based on the 3D IoU metric but outperforms HorizonNet on the corner error and pixel error metrics, thereby indicating the benefit of learning with consistency regularization for semi-supervised layout estimation.

Non-cuboid results on the challenging MatterportLayout test set are presented in FIG. 11. For space considerations, the overall performances of rooms having "mixed corners" are reported. As can be seen in FIG. 11, the effective use of unlabeled data, in combination with labeled data, improves layout estimation across all settings and metrics under consideration, most notably in scenarios with only 50 or 100 labeled images.

Figure 12:
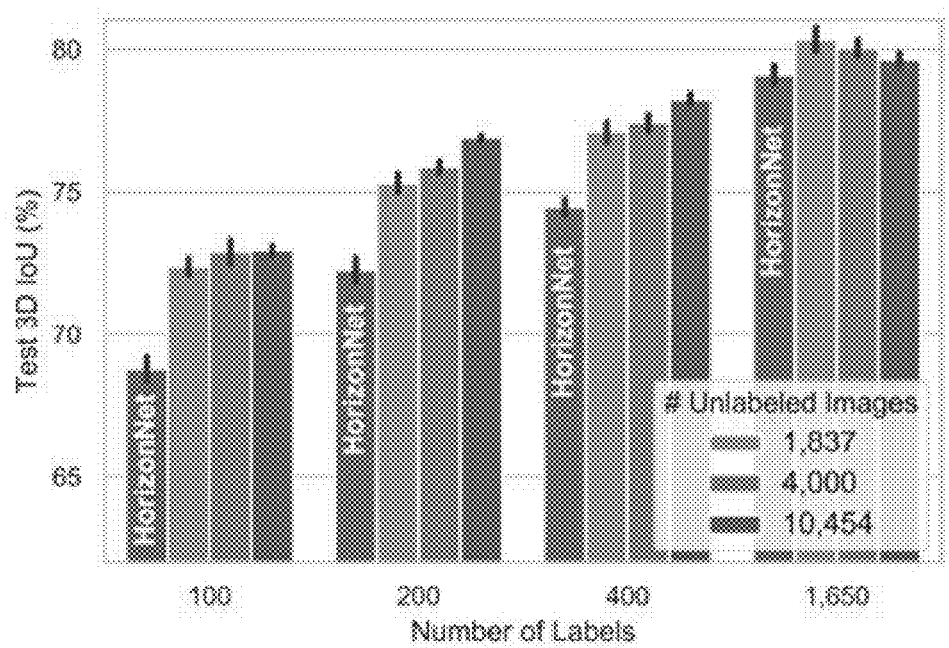
FIG. 12 shows that extra unlabeled data helps improve semi-supervised layout estimation by an average of roughly 1 percent when the number of labels is 400 or fewer.

Further, 2,163 and 8,617 extra unlabeled images were sampled from the Matterport3D dataset and then combined with the MatterportLayout training and validation sets (1,837 images) for a total of 4,000 and 10,454 unlabeled images, respectively. FIG. 12 shows that extra unlabeled data helps improve semi-supervised layout estimation by an average of roughly 1 percent when the number of labels is 400 or fewer. When the fully labelled set is used with 4,000 and 10,454 unlabeled images, test performance dips but remains above the fully supervised HorizonNet baseline. These findings are in contrast to prior results for image classification, where adding unlabeled data from mismatched classes hurt performance compared to the fully supervised setting. These encouraging results suggest that the neural network may be capable of learning additional supervisory signals from extracted unlabeled data, even when there is a data distribution mismatch.

Figure 13:
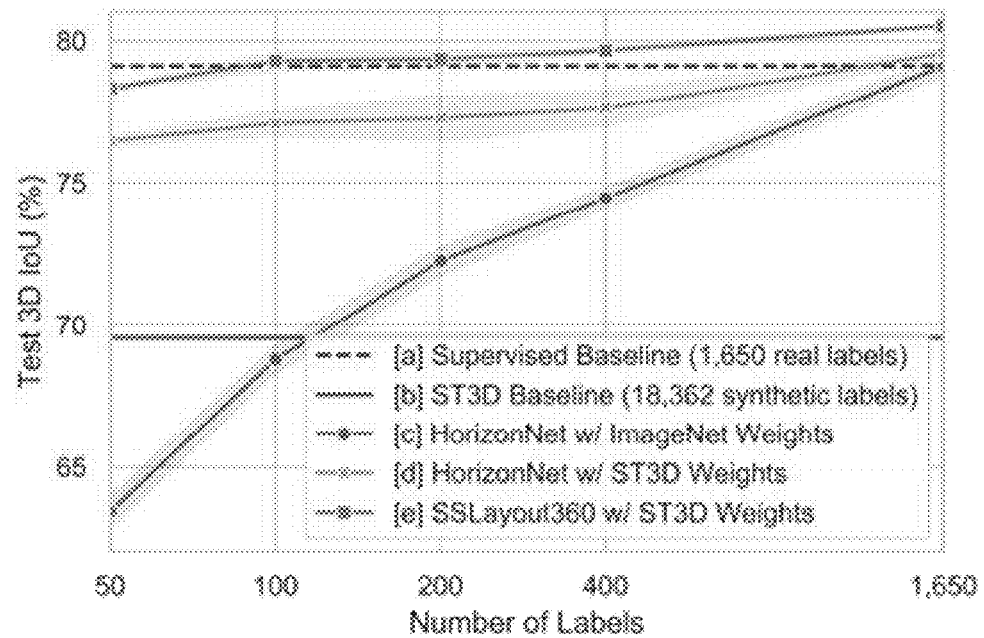
FIG. 13 summarizes the results of supervised and semi-supervised experiments on the MatterportLayout dataset for rooms with mixed corners using synthetic data from the Structured3D dataset.

FIG. 13 summarizes the results of supervised and semi-supervised experiments on MatterportLayout tbr rooms with mixed corners using Structured3D synthetic data. In particular, FIG. 13 summarizes the following findings when Structured3D synthetic data is used to evaluate on MatterportLayout: (1) there is a large performance gap between HorizonNet models trained on real data and synthetic data; (2) HorizonNet models trained on Structured3D and fine-tuned on MatterportLayout outperform HorizonNet models initialized with ImageNet weights; and (3) the neural network with pre-trained HorizonNet matches the fully supervised results using only 200 labels, thereby effectively bridging the performance gap between the real and synthetic domains in a semi-supervised setting.

Figure 14:
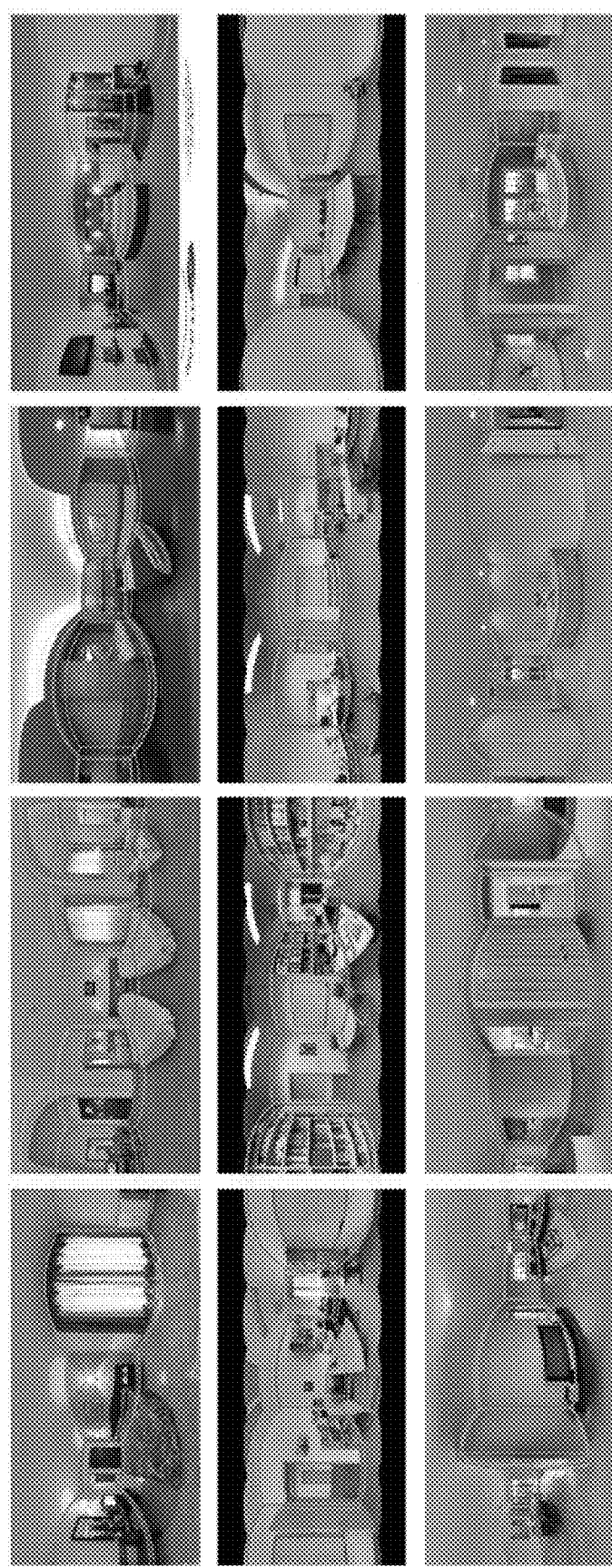
FIG. 14 visually compares test results between the HorizonNet network and the neural architecture that is trained on 100 labels for the PanoContext dataset.

FIG. 14 visually compares test results between Horizon-Net and the neural architecture that is trained on 100 labels for PanoContext, Stanford-2D3D, and MatterportLayout under equirectangular view. More specifically, FIG. 14 includes quantitative test results of cuboid and non-cuboid layout estimation under equirectangular view. These images indicate how the supervised HorizonNet trained on 100 labels compares to the neural architecture trained on the same 100 labels along with unlabeled images for PanoContext (top row), Stanford-2D3D (middle row), and MatterportLayout (bottom row). Juncture lines predicted by HorizonNet are shown in cyan, while juncture lines predicted by the neural architecture are shown in magenta. The green lines correspond to the ground truth. As can be seen in FIG. 14, the neural architecture consistently predicts juncture lines that follow more closely to the ground truth than HorizonNet, which explains the performance gap between the supervised and semi-supervised models.

Processing System

Figure 15:
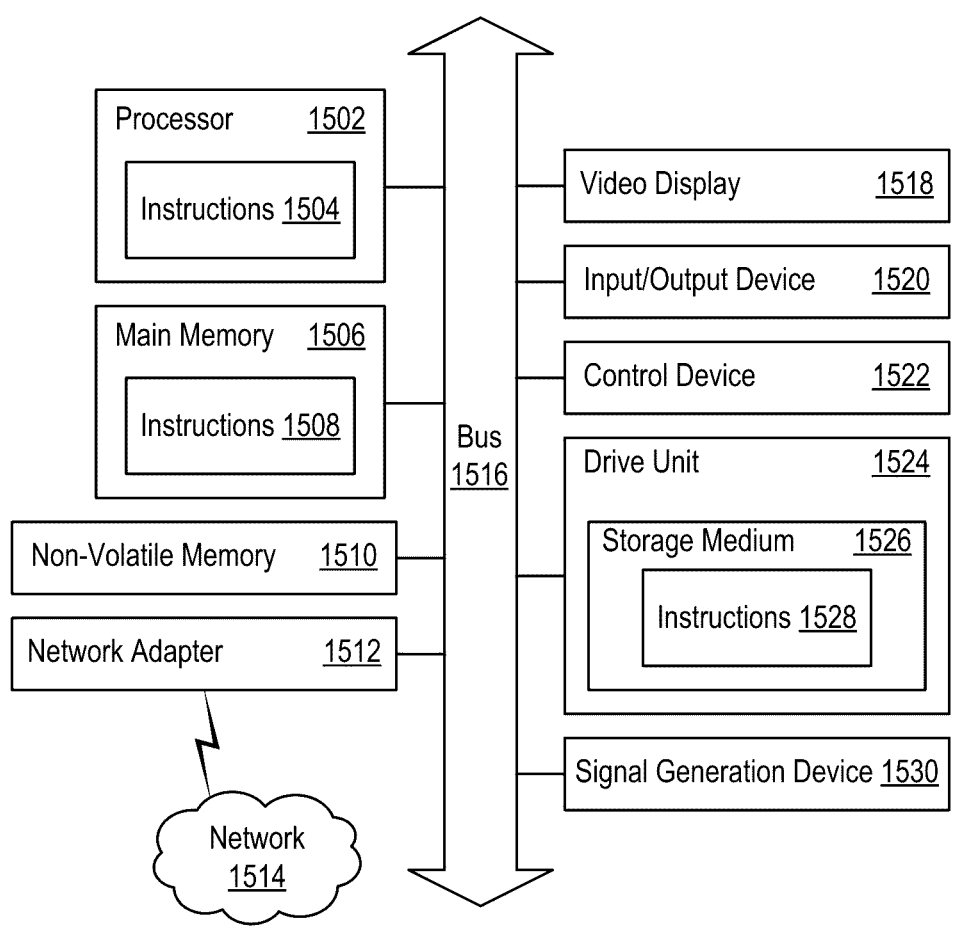
FIG. 15 is a block diagram illustrating an example of a processing system in which at least some operations described herein can be implemented.

FIG. 15 is a block diagram illustrating an example of a processing system 1500 in which at least some operations described herein can be implemented. For example, components of the processing system 1500 may be hosted on a computing device that includes an inspection platform, or components of the processing system 1500 may be hosted on a computing device with which a panorama of an interior space is captured.

The processing system 1500 may include a central processing unit ("processor") 1502, main memory 1506, non-volatile memory 1510, network adapter 1512, video display 1518, input/output devices 1520, control device 1522 (e.g., a keyboard or pointing device), drive unit 1524 including a storage medium 1526, and signal generation device 1530 that are communicatively connected to a bus 1516. The bus 1516 is illustrated as an abstraction that represents one or more physical buses or point-to-point connections that are connected by appropriate bridges, adapters, or controllers. The bus 1516, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit ($I^2C$) bus, or an Institute of Electrical and Electronics Engineers (IEEE) standard 1394 bus (also referred to as "Firewire").

While the main memory 1506, non-volatile memory 1510, and storage medium 1526 are shown to be a single medium, the terms "machine-readable medium" and "storage medium" should be taken to include a single medium or multiple media (e.g., a centralized/distributed database and/or associated caches and servers) that store one or more sets of instructions 1528. The terms "machine-readable medium" and "storage medium" shall also be taken to include any medium that is capable of storing, encoding, or carrying a set of instructions for execution by the processing system 1500.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1504, 1508, 1528) set at various times in various memory and storage devices in a computing device. When read and executed by the processors 1502, the instruction(s) cause the processing system 1500 to perform operations to execute elements involving the various aspects of the present disclosure.

Further examples of machine- and computer-readable media include recordable-type media, such as volatile memory devices and non-volatile memory devices 1510, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 1512 enables the processing system 1500 to mediate data in a network 1514 with an entity that is external to the processing system 1500 through any communication protocol supported by the processing system

1500 and the external entity. The network adapter 1512 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A system for estimating a layout of an interior space, the system comprising:
    a processor;
    a memory with instructions stored therein that, when executed by the processor, cause a computing device to:
        receive, from an image sensor of the computing device:
            one or more labeled panorama images comprising layout annotations, wherein the layout annotations represent boundary junctures associated with the interior space; and
            one or more unlabeled panorama images without layout annotations, wherein the one or more labeled panorama images and the one or more unlabeled panorama images are representative of different portions of the interior space;
        input, to a trained neural network model, the one or more labeled panorama images and the one or more unlabeled panorama images, wherein the trained neural network model is trained in a semi-supervised manner using labeled and unlabeled training data;
        output, by the trained neural network model:
            a reconstruction layout of a least a portion of the interior space; and
            coordinates indicating locations where one or more junctures are located within the reconstruction layout.

2. The system of claim 1, wherein the instructions further cause the computing device to receive, from a sensor suite of the computing device, location data corresponding to one or more juncture positions within the one or more labeled panorama images relative to a coordinate system associated with the interior space.

3. The system of claim 1, wherein the one or more labeled panorama images and the one or more unlabeled panorama images are representative of a same portion of the interior space.

4. The system of claim 1, wherein the trained neural network model comprises a stochastic neural network that is trained by introducing a stochastic weight to each node of the stochastic neural network during training.

5. The system of claim 1, wherein the trained neural network model is selected based on a complexity or a type of room associated with the one or more labeled or unlabeled panorama images.

6. The system of claim 1, wherein the one or more junctures represent locations relative to a coordinate system associated with the interior space where a pair of surfaces join, intersect, merge, or converge with one another within the interior space.

7. The system of claim 1, wherein the trained neural network model is configured to output pixel-level coordinates indicating locations where one or more junctures are located within the reconstruction layout.

8. A method comprising:
    receiving, from an image sensor of a computing device:
        one or more labeled panorama images comprising layout annotations, wherein the layout annotations represent boundary junctures associated with an interior space; and
        one or more unlabeled panorama images without layout annotations, wherein the one or more labeled panorama images and the one or more unlabeled panorama images are representative of different portions of the interior space;
    inputting, to a trained neural network model, the one or more labeled panorama images and the one or more unlabeled panorama images, wherein the trained neural network model is trained in a semi-supervised manner using labeled and unlabeled training data;
    outputting, by the trained neural network model:
        a reconstruction layout of a least a portion of the interior space; and
        coordinates indicating locations where one or more junctures are located within the reconstruction layout.

9. The method of claim 8, further comprising receiving, from a sensor suite of the computing device, location data corresponding to one or more juncture positions within the one or more labeled panorama images relative to a coordinate system associated with the interior space.

10. The method of claim 8, wherein the one or more labeled panorama images and the one or more unlabeled panorama images are representative of a same portion of the interior space.

11. The method of claim 8, wherein the trained neural network model comprises a stochastic neural network that is trained by introducing a stochastic weight to each node of the stochastic neural network during training.

12. The method of claim 8, wherein the trained neural network model is selected based on a complexity of the one or more labeled or unlabeled panorama images.

13. The method of claim 8, wherein the trained neural network model is selected based on a type of room associated with the one or more labeled or unlabeled panorama images.

14. The method of claim 8, wherein the trained neural network model is configured to output pixel-level coordinates indicating locations where one or more junctures are located within the reconstruction layout.

15. The method of claim 8, further comprising outputting dimensions of the interior space.

16. A non-transitory medium with instructions stored thereon that, when executed by a processor of a computing device, cause the computing device to perform operations comprising:

receiving, from an image sensor of the computing device:

one or more labeled panorama images comprising layout annotations, wherein the layout annotations represent boundary junctures associated with an interior space; and one or more unlabeled panorama images without layout annotations, wherein the one or more labeled panorama images and the one or more unlabeled panorama images are representative of different portions of the interior space;

inputting, to a trained neural network model, the one or more labeled panorama images and the one or more unlabeled panorama images, wherein the trained neural network model is trained in a semi-supervised manner using labeled and unlabeled training data;

outputting, by the trained neural network model:

a reconstruction layout of a least a portion of the interior space; and coordinates indicating locations where one or more junctures are located within the reconstruction layout.

* * * * *